(12) United States Patent
Cappello et al.

(10) Patent No.: US 8,789,322 B2
(45) Date of Patent: Jul. 29, 2014

(54) SYSTEM OF JOINING PHOTOVOLTAIC MODULES

(71) Applicant: Cappello Alluminio S.r.l., Ragusa (IT)

(72) Inventors: Giuseppe Cappello, Giarratana (IT);
Giorgio Cappello, Ragusa (IT);
Giovanni Cappello, Giarratana (IT)

(73) Assignee: Cappello Alluminio S.r.l., Ragusa (IT)

( * ) Notice: Subject to any disclaimer, the term of this patent is extended or adjusted under 35 U.S.C. 154(b) by 0 days.

(21) Appl. No.: 13/887,569

(22) Filed: May 6, 2013

(65) Prior Publication Data

US 2013/0298482 A1  Nov. 14, 2013

(30) Foreign Application Priority Data

May 8, 2012  (EP) ..................... 12425085

(51) Int. Cl.
*E04D 13/18* (2014.01)
*H01L 31/048* (2014.01)
*F24J 2/52* (2006.01)
*H01L 31/042* (2014.01)

(52) U.S. Cl.
CPC ............. *H01L 31/0482* (2013.01); *Y02B 10/20* (2013.01); *Y02E 10/50* (2013.01); *F24J 2/5239* (2013.01); *Y02B 10/12* (2013.01); *Y02E 10/47* (2013.01); *F24J 2/5207* (2013.01); *F24J 2/526* (2013.01); *H01L 31/0422* (2013.01)
USPC .............. 52/173.3; 52/710; 126/623; 136/251

(58) Field of Classification Search
USPC ............ 52/173.3, 656.1, 653.1, 582.1, 584.1, 52/698, 700, 710, 475.1, 478, 58; 126/621, 623, 704, 600; 136/244, 230, 136/251; 248/127, 148, 154, 188.1, 237, 248/351, 357, 633, 910, 346.01, 678
See application file for complete search history.

(56) References Cited

U.S. PATENT DOCUMENTS

| | | | |
|---|---|---|---|
| 6,105,317 A * | 8/2000 | Tomiuchi et al. ............. | 52/173.3 |
| 6,959,517 B2 * | 11/2005 | Poddany et al. .............. | 52/173.3 |
| 7,956,279 B2 * | 6/2011 | Morita et al. .................. | 136/251 |
| 2003/0201009 A1* | 10/2003 | Nakajima et al. .............. | 136/251 |
| 2004/0154655 A1* | 8/2004 | Tanaka ........................... | 136/244 |
| 2007/0131273 A1* | 6/2007 | Kobayashi ..................... | 136/251 |
| 2010/0154784 A1* | 6/2010 | King et al. ..................... | 126/623 |
| 2011/0239554 A1* | 10/2011 | Tsuzuki et al. ............... | 52/173.3 |
| 2011/0314752 A1* | 12/2011 | Meier ........................... | 52/173.3 |

* cited by examiner

*Primary Examiner* — Brian Glessner
*Assistant Examiner* — Beth Stephan
(74) *Attorney, Agent, or Firm* — Blank Rome LLP

(57) ABSTRACT

System for butt jointing a first and at least one second photovoltaic module for creating a roof-covering, each module has a panel with photovoltaic cells and a support frame having at least one longitudinal end profile and at least one longitudinal side profile. At least one longitudinal support profile is provided at least for the longitudinal end profile of the frame of the first module, and for the longitudinal end profile of the frame of the second module. The longitudinal end profile in each module has a box-section longitudinal body fixable to the longitudinal side profile, a first longitudinal wing delimiting a seat for engaging the panel, and at least one second longitudinal wing having an arched longitudinal surface for engaging the support profile.

14 Claims, 3 Drawing Sheets

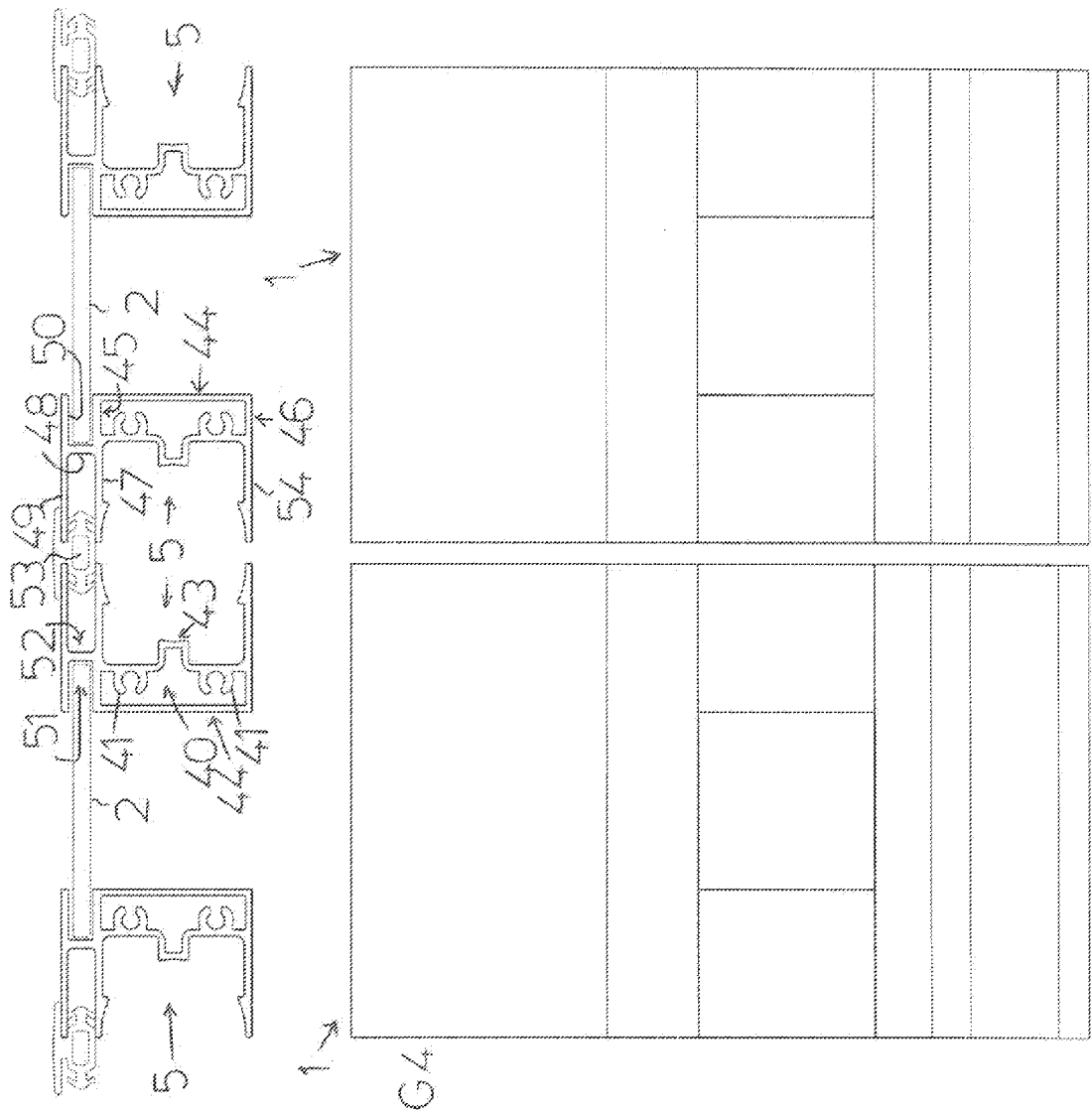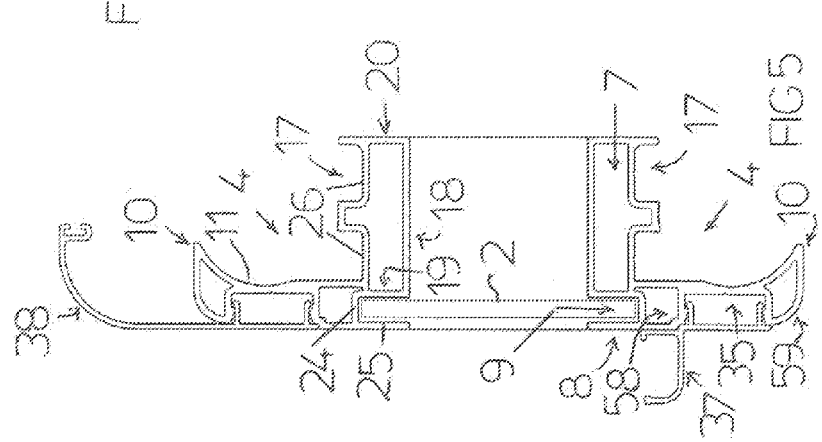

SYSTEM OF JOINING PHOTOVOLTAIC MODULES

RELATED APPLICATIONS

This application claims benefit of priority under 35 USC §119 of European Patent Application No. 12425085.3, filed May 8, 2012, entitled "System for Butt Jointing Photovoltaic Modules, and Roof-covering created with Photovoltaic Modules Joined By Means of Jointing Systems of this type," which application is incorporated herein by reference.

FIELD OF THE INVENTION

The present invention refers to a system for butt jointing photovoltaic modules to create a covering for a roof, or which itself acts as a roof, and to the covering thus created; and more particularly to a preferred but not exclusive application regarding construction or covering of roofs with a single inclined pitch, or of roofs with an arched vault.

BACKGROUND OF THE INVENTION

As is well-known, fitting photovoltaic modules to existing buildings can sometimes be a long and complicated job, usually because of the specific fixing system adopted.

A cladding formed in this way with photovoltaic modules must also not only be perfectly integrated with the architecture of the building but also if possible improve its performance characteristics especially in terms of thermal transmittance.

A technical task of the present invention is to provide a system for butt jointing photovoltaic modules to create a covering for a roof, or which itself acts as a roof, that remedies disadvantages complained of in the state of the art. Within the scope of this technical task, the present invention can be seen variously to provide a jointing system:

which can enable the fitting of a photovoltaic covering with extreme ease and versatility on any existing building;

which makes it possible to create a photovoltaic covering that integrates with the architecture of the building on which it is fitted; and capable of reducing the thermal transmittance of the photovoltaic covering.

SUMMARY OF THE INVENTION

The technical task, and these and other objects, are achieved according to the present invention by creating a system for butt jointing a first and at least one second photovoltaic module for creating a roof-covering, or which itself acts as a roof, and to the covering so created, each module comprising a panel with photovoltaic cells and a support frame having at least one longitudinal end profile and at least one longitudinal side profile, at least one longitudinal support profile being also provided at least for the longitudinal end profile of the frame of the first module, and for the longitudinal end profile of the frame of the second module, characterised in that in each module said longitudinal end profile has a box-section longitudinal body fixable to the longitudinal side profile, a first longitudinal wing delimiting a seat for engaging with the panel, and at least one second longitudinal wing having an arched longitudinal surface for engaging with the support profile, and in that said support profile has a longitudinal base from which extends a first longitudinal support and guide element having an arched longitudinal surface of a shape matching that of said second wing for engaging with the arched surface of the second wing of the end profile of the first module, and a second support and guide element longitudinally parallel to the first support and guide element, and featuring a longitudinal surface of arched form matching that of said second wing for engaging with the arched surface of the second wing of the end profile of the second module, the arched surface of said first and said second support and guide elements being positioned on the same side but at a different distance from said base.

The jointing system features a reduced series of profiles with which both the support frame for the photovoltaic modules and the joint between the support frames are made, and thus enormously simplifies the fitting of the covering acting as a roof or as a covering for a roof of an existing building.

The covering is completely integrated architecturally with the building to which it is fitted, and in cases where it acts as a covering for an existing roof, it also reduces the thermal transmittance of the roof.

Providing a photovoltaic covering which modifies the thermal transmittance of the building can also advantageously cause the energy classification of the building itself to be altered.

Advantageously, the photovoltaic modules can be assembled on the ground, and once a sufficient number of modules have been prepared to cover the area concerned, all that is needed for fitting them is to fix the support profiles which function as guide and support for the frames of the photovoltaic modules. Advantageously, for fitting the covering the support profiles are arranged in equally spaced parallel rows, and the modules are brought side by side and connected by means of rubber expansion joints interposed between the side longitudinal profiles of their frames.

Other characteristics of the present invention are defined, furthermore, in the subsequent claims.

BRIEF DESCRIPTION OF THE DRAWINGS

Further characteristics and advantages of the invention will become more evident from the description of a preferred, but not exclusive, embodiment of the jointing system according to the invention, illustrated by way of indication but without limiting effect, in the attached drawings, wherein:

FIG. 3 shows the side joint between two laterally adjacent photovoltaic modules, where for convenience the butt jointing profiles have been removed from the module frame;

FIG. 4 shows on plan the two laterally adjacent modules of FIG. 3, where for convenience the expansion joints have been removed from the module frame; and FIG. 5 shows a photovoltaic module from whose frame the side profiles have been removed for convenience.

DETAILED DESCRIPTION OF THE ILLUSTRATED EMBODIMENTS

Figure 1:
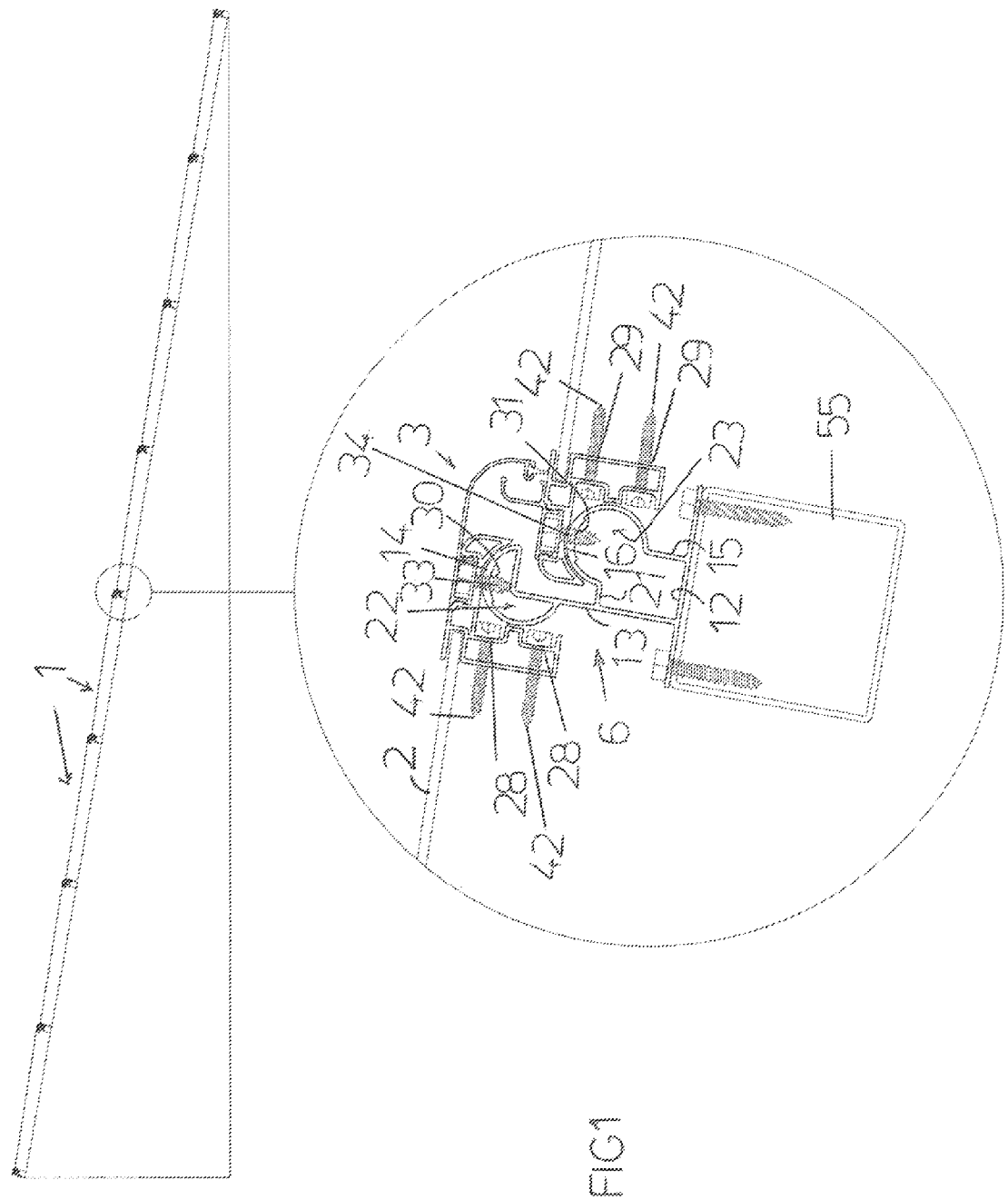
FIG. 1 shows a view of a roof-covering with a single inclined pitch, with an enlargement of the system for butt jointing between two adjacent photovoltaic modules.
Figure 2:
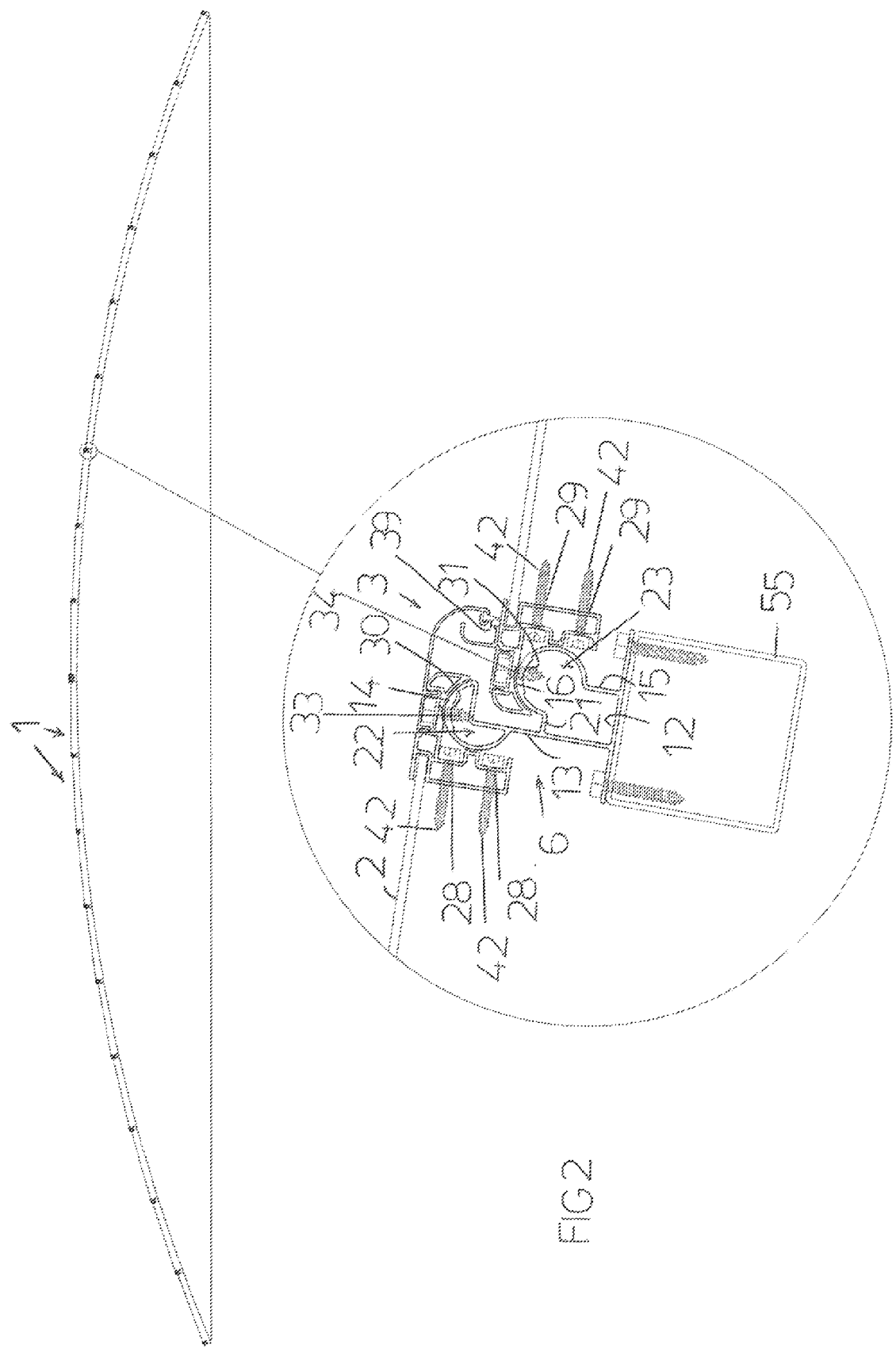
FIG. 2 shows a view of a roof-covering with an arched vault, with an enlargement of the system for butt jointing between two adjacent photovoltaic modules.

With reference to the drawings, a system 1 is shown for butt jointing photovoltaic modules Photovoltaic module 1 comprises a photovoltaic cell panel 2 framed by a support frame 3.

Panel 2 is preferably of rectangular form and consequently the support frame 3 features two opposed longitudinal end profiles 4 and two opposed longitudinal side profiles 5, each of which extends along a corresponding side of the perimeter of panel 2.

The butt jointing system between two photovoltaic modules 1 comprises a longitudinal profile 6 for supporting the longitudinal end profiles 4 adjacent to the frames of the two photovoltaic modules 1.

In each support frame 3, each end profile 4 features a box-section body 7 which extends in the longitudinal direction of the end profile 4 and is fixable to the longitudinal side profiles 5, a first wing 8 which extends in the longitudinal direction of the end profile 4 and delimits a seat 9 for engaging the panel 2, and a second wing 10 which extends in the longitudinal direction of the end profile 4 and features longitudinally an arched surface 11 for engaging with the support profile 6.

The box-section body 7 has a substantially quadrangular transverse section and features a longitudinal front delimiting wall 17, in front of which extend the second wing 10, a longitudinal rear delimiting wall 18, a longitudinal upper delimiting wall 19 surmounted by the first wing 8, and a lower longitudinal delimiting wall 20.

The lower 20, upper 19 and rear 18 delimiting walls of the box-section body 7 are preferably flat.

The front delimiting wall 17 has through holes 28 aligned with corresponding through holes 29 in the rear delimiting wall 18 for introducing bolts 42 for fixing the end profile 4 to the side profile 5.

The holes 28 are formed in recesses 26 in the front delimiting wall 17 where the heads of the bolts 42 are positioned.

The first wing 8 is angled and has a front portion 24 which extends perpendicularly to the upper delimiting wall 19 of the box-section body 7, and an upper portion 25 which extends perpendicularly from the front portion 24 and surmounts the upper delimiting wall 19 of the first wing 8.

The first wing 8 therefore in cooperation with the upper delimiting wall 19 of the box-section body 7 delimits the seat 9 which is located to the rear and is open for the introduction of an end side of panel 2.

The second wing 10 extends perpendicularly from the front delimiting wall 17 of the box-section body 7.

The arched surface 11 of the second wing 10 features concavity facing towards the front delimiting wall 17 of the box-section body 7.

The first wing 8 and the second wing 10 originate substantially at the angle between the front delimiting wall 17 and the upper delimiting wall 19 of the box-section body 7.

Each end profile 4 finally comprises formations 58, 59 for stabilising and reinforcing the second wing 10; said formations together with the second wing 10 define portions of the end profile 4 with closed transverse section. In particular the first formation 58 connects the first wing 8 to the second wing 10, while formation 59 originates and terminates at the top of the second wing 10 on the side opposite to that on which the arched surface 11 is provided.

Each side profile 5 comprises a box-section body 40 which extends longitudinally in the longitudinal direction of side profile 5 and which internally features the seats 41 for the fixing bolts 42 for the end profile 4.

The box-section body 40 has a substantially quadrangular transverse section and consequently has a front longitudinal delimiting wall 43, a rear longitudinal delimiting wall 44, preferably flat, an upper longitudinal delimiting wall 45, preferably flat, and a lower longitudinal delimiting wall 46, preferably flat.

The side profile 5 also features a first wing 47 which extends on the front prolongation of the upper delimiting wall 45, a second wing 54 which extends on the front extension of the lower delimiting wall 46, a third angled wing which features a first portion 48 which extends perpendicularly from the first wing 47 on the opposite side to the one facing towards the box-section body 40 and a second portion 49 which extends perpendicularly from the first portion 48 and surmounts the first wing 47, and a fourth wing 50 which extends on the same plane as the second portion 49 of the third wing and surmounts the upper delimiting wall 45 of the box-section body 40.

The upper delimiting wall 45 of the box-section body 40, in combination with the first portion 48 of the third wing and with the fourth wing 50 delimits a seat 51 for introducing a lateral side of panel 2, while the first wing 47 in combination with the third wing delimits a seat 52 for connecting a rubber expansion joint 53.

Support profile 6 features a base 12 of preferably flat configuration which extends in the longitudinal direction of support profile 6 and from which extends longitudinally a first support and guide element 13 having longitudinally an arched surface 14 of a shape matching the arched surface 11 of the second wing 10 for engaging the arched surface 11 of the second wing 10 of the end profile 4 of the first of the two modules 1 to be butt-jointed, and a second support and guide element 15 longitudinally parallel to the first support and guide element 13 and having longitudinally a surface of arched shape 16 matched with the arched shape 11 of the second wing 10 to engage with the arched surface 11 of the second wing 10 of the end profile 4 of the second of the two modules 1 to be butt-jointed. The arched surface 14 of the first support and guide element 13 and the arched surface 16 of the second support and guide element 15 are positioned with on the same side with respect to the base 12 but at a different distance from it.

At a distance from the base 12 the support profile 6 features a portion 21 connecting the first guide element 13 and the second support and guide element 15 which in their turn extend in particular perpendicularly from the base 12. Preferably the arched surface 14 of the first support and guide element 13 and the arched surface 16 of the second support and guide element 15 form part of a respective closed-section portion 22, 23 of support profile 6.

At the arched surface 14, 16 each support and guide element 13, 15 has through holes 30, 31 for fixing an end profile 4 which in its turn, at the arched surface 11 of the second wing 10, has through holes 32 selectively alignable with the through holes 30 or 31 for introducing suitable fixing bolts 33, 34.

Through holes 32 are located through the wall thickness of the second wing 10, in the recess 35 which separates the formations 58, 59.

In recess 35 a profile 37, 38 can be hooked which, besides covering the fixing bolts 33, 34, is suitably configured in such a way as to create, in the zone where the two modules 1 butt-jointed, a labyrinth barrier for protection against atmospheric agents. If necessary the clearance between the profile 37, 38 and the end profile 4 can be closed by means of a gasket 39 suitable for contributing to the protection against atmospheric agents in the zone where the two modules 1 are butt-jointed.

Construction of the modules 1 before fitting the covering can be carried out on the ground.

Initially, the two perimeter end sides of panel 2 are introduced into the two seats 9 in the end profiles 4 and the two lateral sides of panel 2 are introduced into the two seats 52 in the side profiles 5.

The two end profiles 4 are fixed to the two side profiles 5 by means of fixing bolts 42 and this makes module 1 ready for fitting.

As many modules 1 are assembled in this way as are necessary for the desired surface area of the covering.

For fitting, it is now necessary to fix the support profiles 6 to the building directly or by means of suitable stringers 55.

Many parallel and equally-spaced rows of support profiles 6 are therefore set up, to which the modules 1 are attached.

Each module 1, which has an arched surface 11 for each of the two end profiles 4, is attached by making the first of the two arched surfaces 11 meet up with the arched surface 14 of the first support and guide element 13 on a support profile 6 and the second of the two arched surfaces 11 with the arched surface 16 of the second support and guide element 15 on the adjacent support profile 6.

Stable fixture of the frame of modules 1 by means of bolts 33, 34 to support profiles 6 is advantageously executable completely from the outside. Before fixing, the modules 1 are made to slide along the support profiles 6 as a result of the slidably guided coupling of the arched surfaces 11 to the corresponding arched surfaces 14 and 16 in such a way as to be laterally brought side by side and then laterally connected by means of the rubber thermal expansion joints 53 which ensure the complete continuity of the covering.

The butt jointing system for photovoltaic modules thus described makes it possible to provide a covering versatilely adaptable to any pitched or vaulted roof structure, to set up the modules preliminarily on the ground with simple and fast mechanical fixings and to lay the modules on the support profiles without the use of further tools and without any work being required on the existing masonry structure while integrating the covering within the architectural limits of the building.

In cases where the covering is superimposed on an existing roof, it creates a ventilated cavity which brings about a considerable reduction in the thermal transmittance of the roof.

The jointing system thus conceived is susceptible of numerous modifications and variants, all falling within the scope of the inventive concept; all the details are furthermore replaceable by technically equivalent elements.

In practice the materials employed and also the dimensions can be any according to the requirements and the state of the art.

What is claimed is:

1. A system for butt jointing photovoltaic modules, the system comprising first photovoltaic module and at least one second photovoltaic module for creating a roof-covering, each module comprising:
   a panel with photovoltaic cells; and
   a support frame having:
      at least one longitudinal end profile; and
      at least one longitudinal side profile;
   wherein at least one longitudinal support profile is also provided at least for the longitudinal end profile of the support frame of the first module and for the longitudinal end profile of the support frame of the second module; and
   wherein in each module the at least one longitudinal end profile has:
      a box-section longitudinal body fixable to the at least one longitudinal side profile;
      a first longitudinal wing delimiting a seat for engaging the panel; and
      at least one second longitudinal wing having an arched longitudinal surface for engaging the at least one longitudinal support profile, where the at least one longitudinal support profile has a longitudinal base from which extends:
         a first longitudinal support and guide element having an arched longitudinal surface of a shape matching that of the at least one second longitudinal wing for engaging with the arched surface of the at least one second longitudinal wing of the at least one longitudinal end profile of the first module; and
         a second longitudinal support and guide element longitudinally parallel to the first longitudinal support and guide element, and having a longitudinal surface of arched form matching that of the at least one second longitudinal wing for engaging with the arched surface of the at least one second longitudinal wing of the at least one longitudinal end profile of the second module, where the arched surfaces of each of the first and the second longitudinal support and guide elements are positioned on the same side of, but at a different distance from, the longitudinal base.

2. The system of claim 1, wherein the box-section longitudinal body has a quadrangular transverse section and features:
   a longitudinal front delimiting wall in front of which extends the at least one second longitudinal wing;
   a longitudinal rear delimiting wall;
   a longitudinal upper delimiting wall surmounted by the first longitudinal wing; and
   a longitudinal lower delimiting wall.

3. The system of claim 2, wherein the first longitudinal wing has a front portion which is extended perpendicularly to the longitudinal upper delimiting wall, and an upper portion which extends perpendicularly from the front portion and surmounts the longitudinal front delimiting wall of the first longitudinal wing.

4. The system of claim 2, wherein the at least one second longitudinal wing extends perpendicularly from the longitudinal front delimiting wall of the box-section longitudinal body.

5. The system of claim 2, wherein the arched longitudinal surface of the at least one second longitudinal wing features concavity facing towards the longitudinal front delimiting wall of the box-section longitudinal body.

6. The system of claim 1, wherein the longitudinal base is flat.

7. The system of claim 1, wherein each of the first and the second longitudinal support and guide elements extend perpendicularly from the longitudinal base.

8. The system of claim 1, wherein the at least one longitudinal support profile has a connecting portion between the first and the second longitudinal support and guide elements.

9. The system of claim 1, wherein the arched surface of the first longitudinal support and guide element and the arched surface of the second longitudinal support and guide element form part of a respective closed-section portion of the at least one longitudinal support profile.

10. The system of claim 1, further comprising a profile for creating a labyrinth barrier, hookable into a recess provided in the at least one longitudinal end profile.

11. A roof-covering featuring a plurality of systems for butt jointing photovoltaic modules each of the plurality of systems comprising a first photovoltaic module and at least one second photovoltaic module, each module comprising:
   a panel with photovoltaic cells; and
   a support frame having:
      at least one longitudinal end profile; and at least one longitudinal side profile;
wherein at least one longitudinal support profile is also provided at least for the longitudinal end profile of the support frame of the first module and for the longitudinal end profile of the support frame of the second module;
wherein in each module the at least one longitudinal end profile has:
a box-section longitudinal body fixable to the at least one longitudinal side profile;
a first longitudinal wing delimiting a seat for engaging the panel; and
at least one second longitudinal wing having an arched longitudinal surface for engaging the at least one longitudinal support profile, where the at least one longitudinal support profile has a longitudinal base from which extends:
a first longitudinal support and guide element having an arched longitudinal surface of a shape matching that of the at least one second longitudinal wing for engaging with the arched surface of the at least one second longitudinal wing of the at least one longitudinal end profile of the first module; and
a second longitudinal support and guide element longitudinally parallel to the first longitudinal support and guide element, and having a longitudinal surface of arched form matching that of the at least one second longitudinal wing for engaging with the arched surface of the at least one second longitudinal wing of the at least one longitudinal end profile of the second module, where the arched surfaces of each of the first and the second longitudinal support and guide elements are positioned on the same side of, but at a different distance from, the longitudinal base;
wherein the longitudinal support profiles are arranged in equally spaced parallel rows; and
wherein the modules are laterally side by side and connected by rubber expansion joints interposed between the longitudinal side profiles of their respective support frames.

12. A roof for a building including a covering featuring a plurality of systems for butt jointing photovoltaic modules, each of the plurality of systems comprising a first photovoltaic module and at least one second photovoltaic module, each module comprising:
a panel with photovoltaic cells; and
a support frame having:
at least one longitudinal end profile; and
at least one longitudinal side profile;
wherein at least one longitudinal support profile is also provided at least for the longitudinal end profile of the support frame of the first module and for the longitudinal end profile of the support frame of the second module;
wherein in each module the at least one longitudinal end profile has:
a box-section longitudinal body fixable to the at least one longitudinal side profile;
a first longitudinal wing delimiting a seat for engaging the panel; and
at least one second longitudinal wing having an arched longitudinal surface for engaging the at least one longitudinal support profile, where the at least one longitudinal support profile has a longitudinal base from which extends:
a first longitudinal support and guide element having an arched longitudinal surface of a shape matching that of the at least one second longitudinal wing for engaging with the arched surface of the at least one second longitudinal wing of the at least one longitudinal end profile of the first module; and
a second longitudinal support and guide element longitudinally parallel to the first longitudinal support and guide element, and having a longitudinal surface of arched form matching that of the at least one second longitudinal wing for engaging with the arched surface of the at least one second longitudinal wing of the at least one longitudinal end profile of the second module, where the arched surfaces of each of the first and the second longitudinal support and guide elements are positioned on the same side of, but at a different distance from, the longitudinal base;
wherein the longitudinal support profiles are arranged in equally spaced parallel rows; and
wherein the modules are brought laterally side by side and connected by rubber expansion joints interposed between the longitudinal side profiles of the respective support frames.

13. A method of fitting a roof-covering with jointing systems of photovoltaic modules, the method comprising the steps of:
initially, for assembly of each photovoltaic module, introducing each of two perimeter end sides of each photovoltaic panel into a seat of a corresponding longitudinal end profile;
introducing each of two lateral sides of each photovoltaic panel into a seat of a corresponding longitudinal side profile;
fixing the two longitudinal end profiles to the two longitudinal side profiles using fixing bolts;
repeating the above steps for a desired surface area of the roof-covering;
fixing longitudinal support profiles to a roof, arranging at least two equally spaced parallel rows of the longitudinal support profiles, each photovoltaic module, which has an arched surface for each of the two longitudinal end profiles, being attached to respective longitudinal support profiles by making the first of the two arched surfaces meet up with the arched surface of a first support and guide element on a longitudinal support profile and the second of the two arched surfaces meet up with the arched surface of a second support and guide element on a respective, adjacent longitudinal support profile, before fixing the photovoltaic modules, the photovoltaic modules being capable of sliding along the longitudinal support profiles as a result of slidably guided couplings of the arched surfaces on corresponding arched surfaces in such a way as to be brought laterally side by side,
wherein each photovoltaic module comprises:
a panel with photovoltaic cells; and
a support frame having:
at least one longitudinal end profile; and
at least one longitudinal side profile;
wherein at least one longitudinal support profile is also provided at least for the longitudinal end profile of the support frame of the first module and for the longitudinal end profile of the support frame of the second module; and
wherein in each module the at least one longitudinal end profile has:
a box-section longitudinal body fixable to the at least one longitudinal side profile;
a first longitudinal wing delimiting a seat for engaging the panel; and at least one second longitudinal wing having an arched longitudinal surface for engaging the at least one longitudinal support profile, where the at least one longitudinal support profile has a longitudinal base from which extends:
- a first longitudinal support and guide element having an arched longitudinal surface of a shape matching that of the at least one second longitudinal wing for engaging with the arched surface of the at least one second longitudinal wing of the at least one longitudinal end profile of the first module; and
- a second longitudinal support and guide element longitudinally parallel to the first longitudinal support and guide element, and having a longitudinal surface of arched form matching that of the at least one second longitudinal wing for engaging with the arched surface of the at least on second longitudinal wing of the at least one longitudinal end profile of the second module, where the arched surfaces of each of the first and the second longitudinal support and guide elements are positioned on the same side of but at a different distance from, the longitudinal base.

14. The method of claim 13, wherein the photovoltaic modules are laterally connected by rubber expansion joints to ensure complete continuity of the roof-covering.

* * * * *